(12) United States Patent
Craven

(10) Patent No.: US 8,847,768 B2
(45) Date of Patent: Sep. 30, 2014

(54) DEVICE AND SYSTEM DESIGNED TO MOVE, MAKE NOISE AND SCARE UNWANTED ANIMALS AND BIRDS OUT OF GARDENS AND FIELDS

(76) Inventor: Bruce Craven, Baxley, GA (US)

( * ) Notice: Subject to any disclaimer, the term of this patent is extended or adjusted under 35 U.S.C. 154(b) by 85 days.

(21) Appl. No.: 13/485,880

(22) Filed: May 31, 2012

(65) Prior Publication Data

US 2013/0321158 A1    Dec. 5, 2013

(51) Int. Cl.
*G08B 23/00* (2006.01)
*A01M 29/16* (2011.01)
*A01M 29/06* (2011.01)

(52) U.S. Cl.
CPC ............. *A01M 29/06* (2013.01); *A01M 29/16* (2013.01)
USPC ..................................... 340/573.2

(58) Field of Classification Search
USPC .......... 340/573.2, 573.1, 309.16, 384.1; 43/2; 119/719
See application file for complete search history.

(56) References Cited

U.S. PATENT DOCUMENTS

| | | | | |
|---|---|---|---|---|
| 4,890,571 | A * | 1/1990 | Gaskill | 116/22 A |
| 5,966,075 | A * | 10/1999 | Blanks | 340/573.2 |
| 6,351,908 | B1 * | 3/2002 | Thomas | 43/1 |
| 7,690,146 | B2 * | 4/2010 | Jong et al. | 43/1 |
| 8,171,875 | B1 * | 5/2012 | Caldwell et al. | 116/22 A |
| 2004/0194365 | A1 * | 10/2004 | Summers et al. | 43/43.2 |
| 2005/0160654 | A1 * | 7/2005 | Cosciani | 43/2 |
| 2008/0314334 | A1 * | 12/2008 | Dalton | 119/719 |

* cited by examiner

*Primary Examiner* — Phung Nguyen

(57) ABSTRACT

A device turns on at desired times, moves an object or objects, and optionally makes sounds to scare animals away. The object can be, for example, a moving scare crow that is designed to keep unwanted wildlife out of yards, gardens, fields, orchards and the like. The device is simple, easy to use, and does not harm people, animals or their habitat.

11 Claims, 4 Drawing Sheets

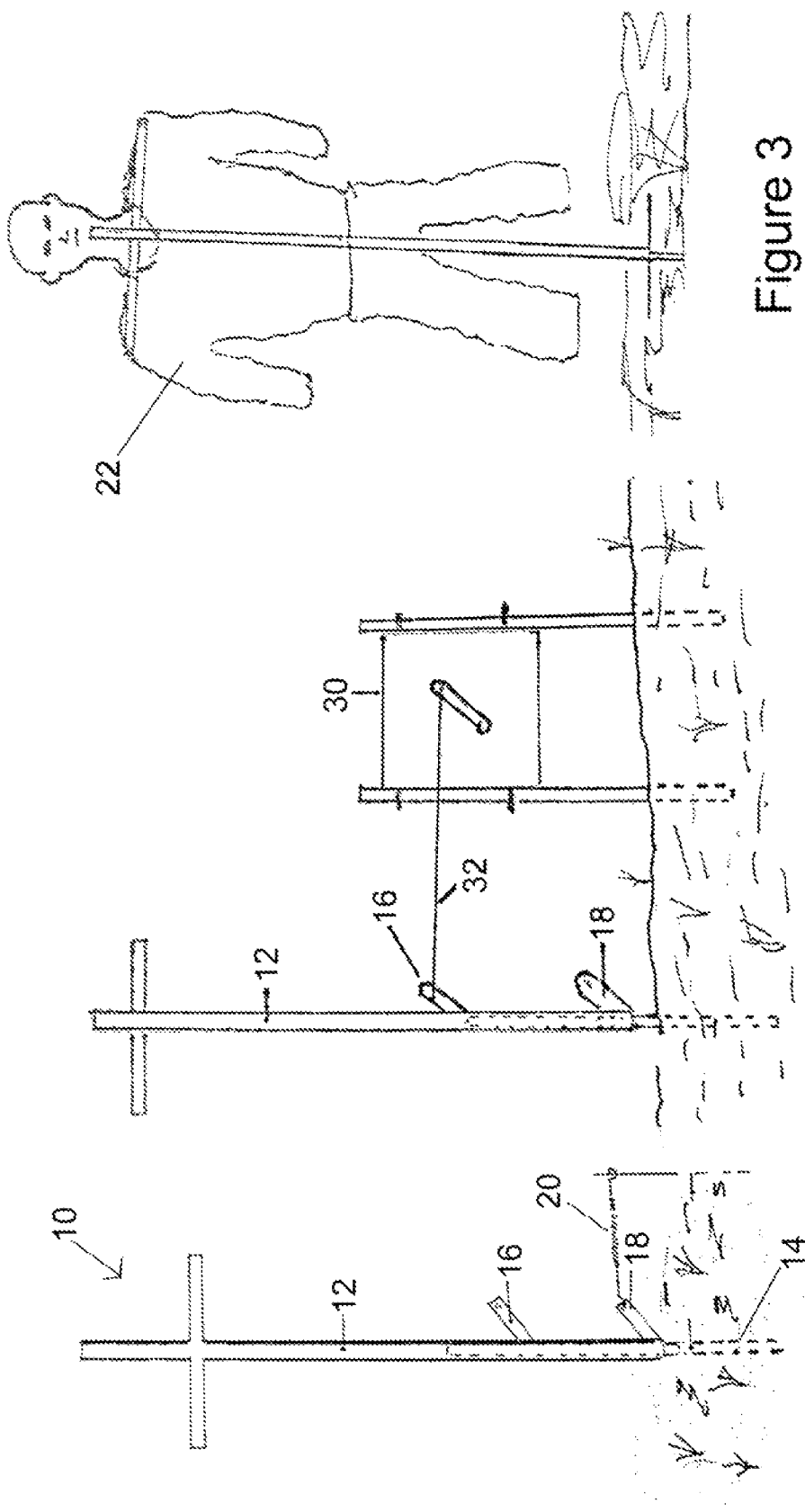

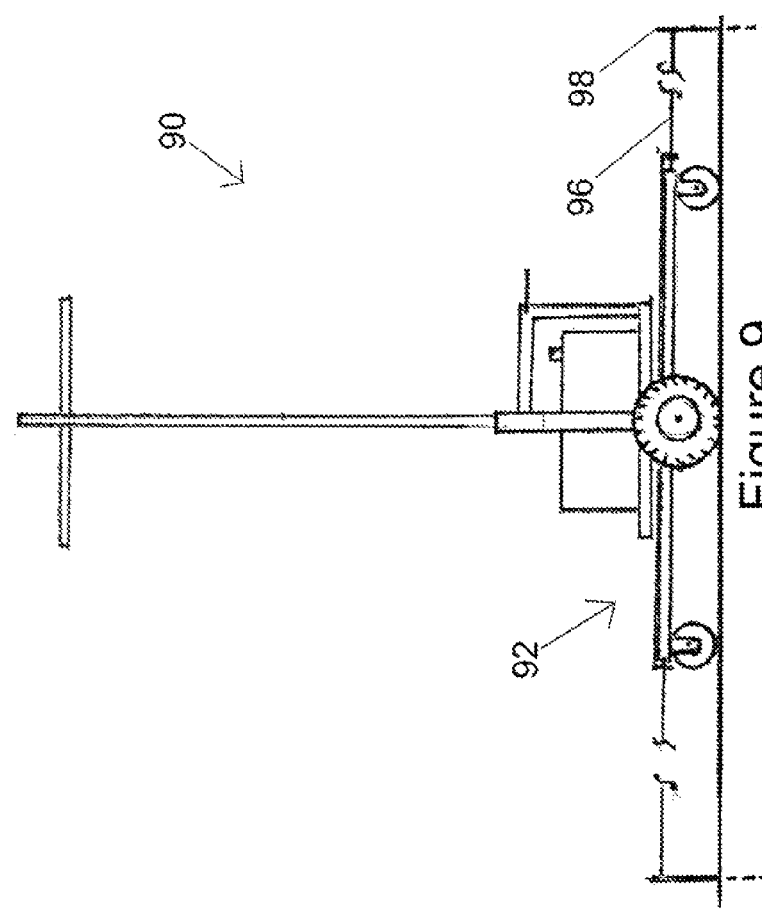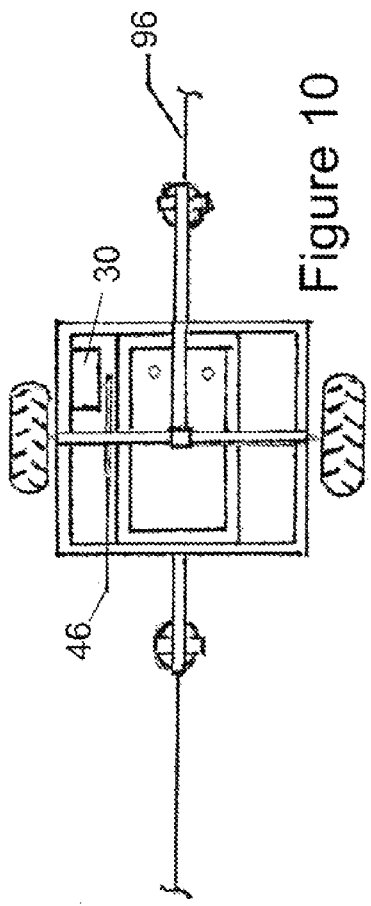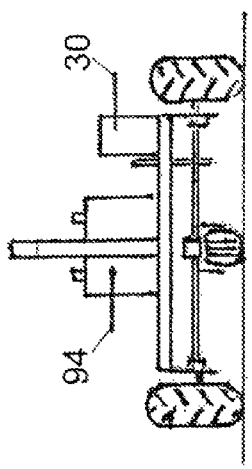

US 8,847,768 B2

DEVICE AND SYSTEM DESIGNED TO MOVE, MAKE NOISE AND SCARE UNWANTED ANIMALS AND BIRDS OUT OF GARDENS AND FIELDS

BACKGROUND OF THE INVENTION

The present invention relates to animal control products and, more particularly, to an electronic machine that moves an object to scare unwanted animals and birds out of gardens and fields.

Often, scare crows are used in gardens and fields to keep out unwanted animals. However, animals can get used to a stationary object, such as a conventional scare crow, placed in a field and, eventually, not be frightened by such objects.

As can be seen, there is a need for a device to move objects to scare unwanted animals and birds out of gardens and fields.

SUMMARY OF THE INVENTION

In one aspect of the present invention, a moving scare crow comprises a scare crow frame adapted to hold a human form thereupon; a drive assembly disposed adjacent to the scare crow frame; a connecting rod connected to a rotating member of the drive assembly to a main drive arm of the scare crow frame, the main drive arm connected to the scare crow frame; and a drive motor adapted to move the rotating member, causing the connecting rod to move the main drive arm and, in turn, the scare crow frame.

In another aspect of the present invention, a system for scaring animals and birds away from an area comprises a scare crow frame adapted to hold a human form thereupon; a drive assembly disposed adjacent to the scare crow frame; a connecting rod connected to a rotating member of the drive assembly to a main drive arm of the scare crow frame, the main drive arm connected to the scare crow frame; a drive motor adapted to move the rotating member, causing the connecting rod to move the main drive arm and, in turn, the scare crow frame; a spring return adapted to resilient retain the scare crow frame in an initial, upright position; an auxiliary drive arm attached to the scare crow frame; a speaker adapted to play a sound at desired times; and a timing relay adapted to provide power to the drive motor and cause the speaker to play a sound at desired times.

These and other features, aspects and advantages of the present invention will become better understood with reference to the following drawings, description and claims.

BRIEF DESCRIPTION OF THE DRAWINGS

FIG. 1 is a perspective view of a scare crow frame according to an exemplary embodiment of the present invention;

FIG. 2 is a perspective view of the scare crow frame of FIG. 1 connected to a drive assembly according to an exemplary embodiment of the present invention;

FIG. 3 is a perspective view of a scare crow disposed on the scare crow frame of FIG. 1;

FIG. 9 is a front view of a portable, wheeled scare crow assembly according to an exemplary embodiment of the present invention;

FIG. 10 is a top view of the wheeled scare crow assembly of FIG. 9; and

FIG. 11 is a front view of the wheeled scare crow assembly of FIG. 9.

DETAILED DESCRIPTION OF THE INVENTION

Figure 6:
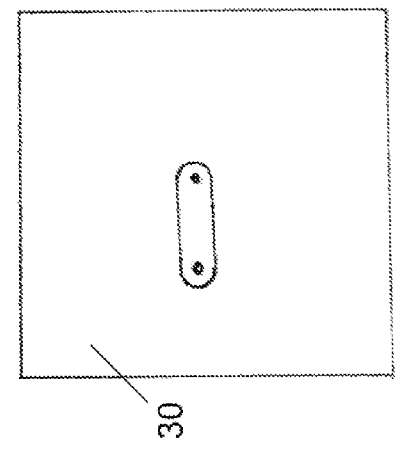
FIG. 6 is a back view of the drive assembly of FIG. 2.
Figure 7:
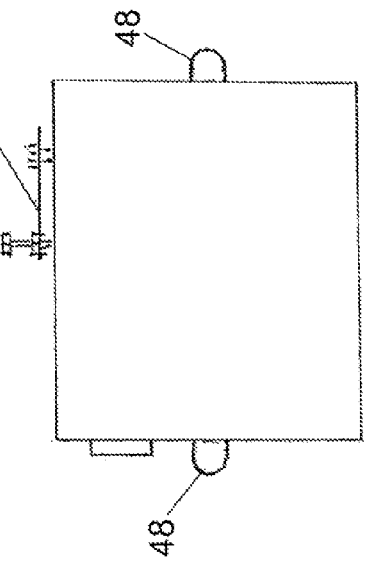
FIG. 7 is a top view of the drive assembly of FIG. 2.
Figure 4:
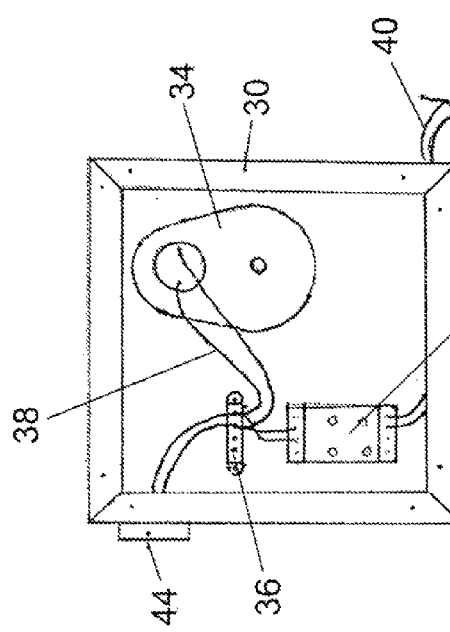
FIG. 4 is a front view of the drive assembly of FIG. 2.
Figure 5:
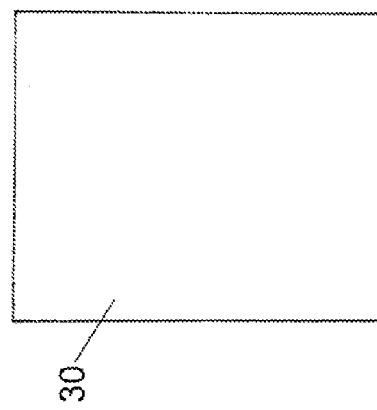
FIG. 5 is a side view of the drive assembly of FIG. 2.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a device that comes on at desired times, moves an object or objects, optionally makes sounds and scares animals away. The object can be, for example, a moving scare crow that is designed to keep unwanted wildlife out of yards, gardens, fields, orchards and the like. The device is simple, easy to use, and does not harm people, animals or their habitat.

The device can be powered by, for example, a 12 volt rechargeable battery through a timing device that has adjustable on-off cycles to conserve battery power. The device may have a programmable time clock, photo cell or other device to operate the device at desired times such as mornings, evenings or night time. The system may be powered by different sources, such as batteries, alternating current (AC) electricity, solar power, or a combination thereof.

As described below, the system can be built on wheels to move it around in a field, yard, orchard or other area. In some embodiments, the system may be built to remain stationary and simply move back and forth, emit sounds and/or flashing lights. The stationary system may be connected to multiple scare crow frames, as described below, connected together with a small cable or wire to cover larger areas. The cable guide for the scare crow on wheels and the connecting wire for the stationary system can rest on the ground and may be passed over with tractors, trucks or other equipment. Typically, the cable guide is made of steel to prevent stretching.

Referring to FIGS. 1 through 3, a scare crow frame 10 may be made from a pipe mast 12, made typically or steel, plastic or the like, having a diameter from about ¾ inch to about 1½ inches, for example. A mast support pipe 14 may extend from the bottom of the pipe mast 12 and may be adapted to be inserted into the ground. The mast support pipe 14 may have a diameter smaller than the pipe mast 12.

A main drive arm 16 may be attached to the pipe mast 12. An auxiliary drive arm 18 may be attached to the pipe mast 12, typically below the main drive arm 16. A spring return 20 may be provided on the auxiliary drive 18 to urge the auxiliary drive arm 18 to an initial position as shown in FIG. 1.

As shown in FIG. 3, the scare crow frame 10 can be decorated with a human form, such as by a scare crow 22, to scare away animals and birds, for example. The scare crow 22 may be moved when a drive assembly 30 moves the main drive arm 16 via a connecting rod 32, as described below.

Referring now to FIGS. 4 through 7, the drive assembly 30 may include a drive motor 34 electrically connected to a terminal strip 36 with wires 38. Electrical power can be provided via power lines 40. The power lines 40 may provide power to a timing relay 42. The timing relay 42 may control when the drive motor 34 and a speaker 44 is energized with power from the power lines 40. The speaker 44 may provide a sound to help scare away animals and birds, for example.

A rotating cam or drive sprocket 46 may be turned by the drive motor 34. The rotating cam or drive sprocket 46 can be connected to the connecting rod 32 such that the drive motor 34 moves the main drive arm 16.

U-bolts 48 may be disposed on the sides of the drive assembly 30. The U-bolts 48 may be useful for securing the drive assembly 30 in a desired position.

Figure 8:
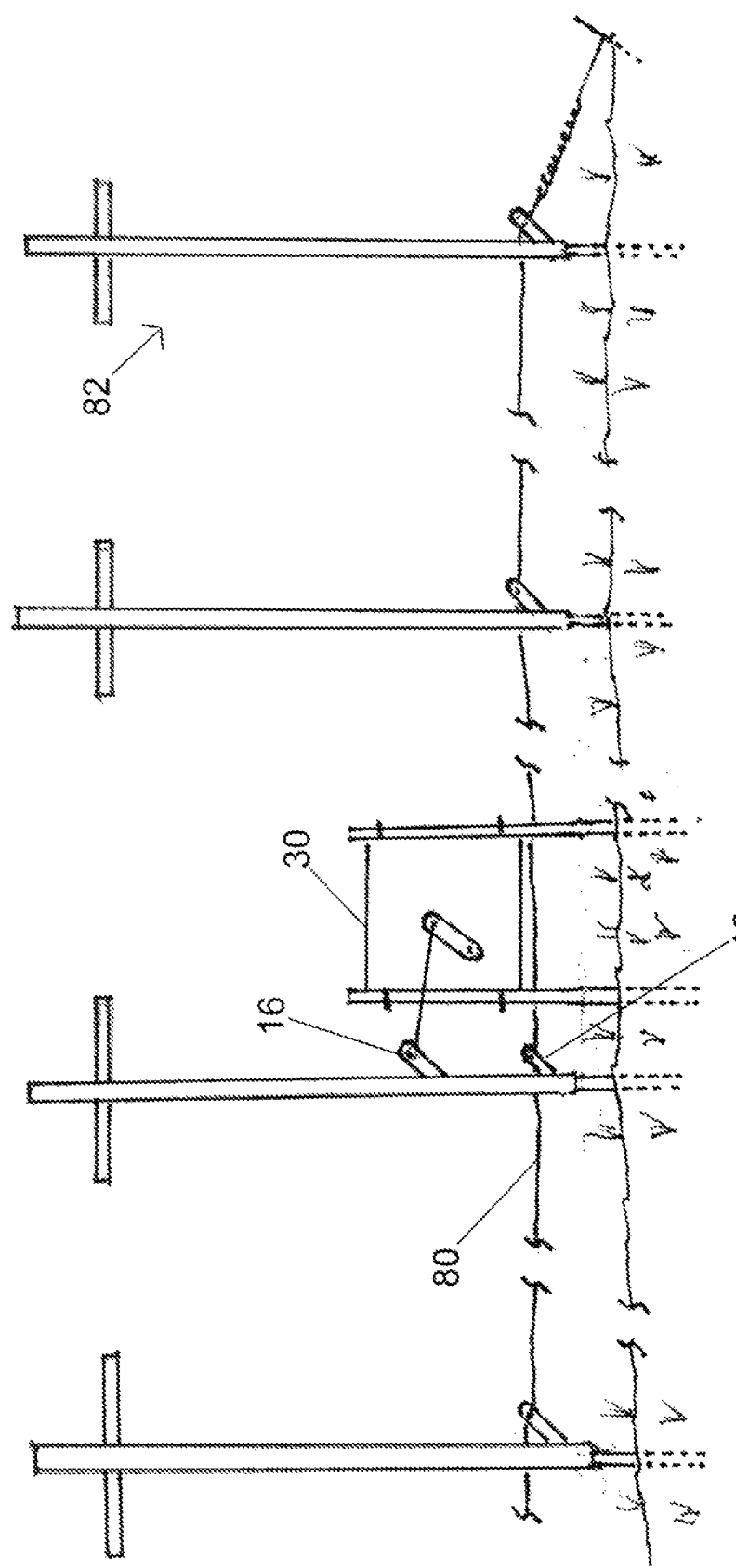
FIG. 8 is a perspective view of a drive assembly connected to multiple scare crow frames according to an exemplary embodiment of the present invention.

Referring to FIG. 8, multiple scare crow frames may be connected together. The auxiliary drive arms 18 of adjacent scare crow frames may be interconnected with a wire 80. The last scare crow frame 82 in a row of multiple scare crow frames may have the spring return 20 connected to urge the auxiliary drive arm 18 to an angled position. As the drive assembly 30 moves main drive arm 16 back and forth, which causes the auxiliary drive arm 18 to move, moving the wire 80 to cause adjacent scare crow frames to move. The spring return 20 causes the auxiliary drive arm 18 to move back to an initial position (as shown in FIG. 8, for example).

Referring now to FIGS. 9 through 11, a wheeled scare crow frame 90 may be disposed on a wheeled device 92. A power source 94 may be disposed directly on the wheeled device 92. The wheeled scare crow frame 90 may operate similarly to the scare crow frame described above. A guide cable 96 may extend from the wheeled device 92 and be secured with anchors 98.

The following described a sequence for operation of the device of the present invention. When power is applied to the system, the adjustable timing relay will energize the motor, sound emitting device, lights and other features for a length of time as determined by the setting of the on cycle of the relay. At the end of the on cycle the system will de-energize and remain off for a length of time as determined by the off cycle of the relay. The on/off cycles are adjustable for any desired length of time. When the system is energized, the motor turns and has a sprocket and chain connected to a wheel that drives the system forward or backward. The system is guided along a path by a cable or wire that passes thru the frame and is anchored at each end. When the system reaches the anchor at either end of the guide, a reversing switch linkage will trip a switch that will reverse the power to the motor and cause the system to travel in the opposite direction until reaching the other end of the guide. The guide cable or wire may be long as necessary for use in large fields or orchards.

The stationary system uses the same drive motor anchored by two 1" pipes driven into the earth and attached to the enclosure by U-bolts. The drive motor has a rotating cam instead of a sprocket and is attached to the moving scare crow frame with a steel connecting rod. The frame may be connected to multiple frames for covering larger areas. The frames are tied together with a small wire or cable. When the cam on the motor turns it moves the frame back and forth. As the frame moves the wire or cable to the other frames is pulled in the same direction causing all frames to move. An anchor at each of the last frames has a spring attached to the frame that pulls the wire or cable back each time the cam turns to make the frames move back and forth.

The frames may be decorated with clothing, painted wig stand, and other items to make the stand look like a human being. The frames may have bells or other items attached that emit sounds as the frames move back and forth.

It should be understood, of course, that the foregoing relates to exemplary embodiments of the invention and that modifications may be made without departing from the spirit and scope of the invention as set forth in the following claims.

What is claimed is:

1. A moving scare crow comprising:
   a scare crow frame adapted to hold a human form thereupon;
   a main drive arm connected to the scare crow frame;
   a drive assembly disposed outside of and adjacent to the scare crow frame, wherein the drive assembly has a rotating member;
   a connecting rod connected to the rotating member of the drive assembly to the main drive arm of the scare crow frame and
   a drive motor adapted to move the rotating member, causing the connecting rod to move the main drive arm and, in turn, move the scare crow frame from an initial, upright position.

2. The moving scare crow of claim 1, further comprising a spring return adapted to resiliently retain the scare crow frame from an angled position into an initial, upright position.

3. The moving scare crow of claim 1, further comprising an auxiliary drive arm attached to the scare crow frame.

4. The moving scare crow of claim 1, further comprising a wire interconnecting a second scare crow frame with the scare crow frame at their respective auxiliary drive arms.

5. The moving scare crow of claim 1, further comprising a timing relay adapted to provide power to the drive motor at desired times.

6. The moving scare crow of claim 1, further comprising a speaker adapted to play a sound at desired times.

7. The moving scare crow of claim 1, further comprising a wheeled device supporting the scare crow frame and the drive assembly.

8. The moving scare crow of claim 1, further comprising a wire interconnecting a second scare crow frame with the scare crow frame at their respective auxiliary drive arms.

9. The moving scare crow of claim 8, further comprising a wheeled device supporting the scare crow frame and the drive assembly.

10. A moving scare crow comprising:
    a scare crow frame adapted to hold a human form thereupon;
    a main drive arm connected to the scare crow frame;
    an auxiliary drive arm connected to the scare crow frame;
    a drive assembly disposed outside of and adjacent to the scare crow frame, wherein the drive assembly has a rotating member;
    a connecting rod connected to the rotating member of the drive assembly to the main drive arm on the scare crow frame;
    a drive motor adapted to move the rotating member, causing the connecting rod to move the main drive arm and, in turn, the scare crow frame; and
    a wire interconnecting a second scare crow frame with the scare crow frame at their respective auxiliary drive arms.

11. A system for scaring animals and birds away from an area, the system comprising:
    a scare crow frame adapted to hold a human form thereupon;
    a main drive arm connected to the scare crow frame;
    an auxiliary drive arm connected to the scare crow frame;
    a drive assembly disposed outside of and adjacent to the scare crow frame, wherein the drive assembly has a rotating member;
    a connecting rod connected to the rotating member of the drive assembly to the main drive arm on the scare crow frame;
    a drive motor adapted to move the rotating member, causing the connecting rod to move the main drive arm and, in turn, the scare crow frame; and
    a wheeled device supporting the scare crow frame and the drive assembly.

* * * * *